United States Patent [19]

Elmer

[11] 4,134,681
[45] Jan. 16, 1979

[54] METHOD OF DETERMINING RELATIVE ORIENTATION OF PHYSICAL SYSTEMS

[75] Inventor: Frank J. Elmer, Spring Lake Heights, N.J.

[73] Assignee: The United States of America as represented by the Secretary of the Army, Washington, D.C.

[21] Appl. No.: 701,918

[22] Filed: Aug. 5, 1976

[51] Int. Cl.² ............................................. G01B 11/26
[52] U.S. Cl. ...................................... 356/152; 33/239; 364/434; 364/456
[58] Field of Search ............... 356/141, 152; 244/3.14; 89/41 L; 33/238, 239; 364/434, 456

[56] References Cited

U.S. PATENT DOCUMENTS

| | | | |
|---|---|---|---|
| 3,049,294 | 8/1962 | Newell | 244/3.14 |
| 3,415,465 | 12/1968 | Bedford | 244/3.14 |
| 3,527,429 | 9/1970 | Hawes, Jr. et al. | 244/3.14 |
| 3,696,248 | 10/1972 | Cunningham et al. | 356/152 |
| 3,799,676 | 3/1974 | Chatterton | 356/152 |
| 3,923,402 | 12/1975 | Turcotte | 356/152 |
| 3,953,132 | 4/1976 | Michelsen | 356/152 |
| 3,995,792 | 12/1976 | Otto et al. | 244/3.14 |

Primary Examiner—S. C. Buczinski
Attorney, Agent, or Firm—Nathan Edelberg; Sheldon Kanars; Daniel D. Sharp

[57] ABSTRACT

A method and system are provided to determine the relative orientation of two physical systems (i.e., assemblages of equipment which share a common, locally defined coordinate system). Two distinct beam vectors (i.e. fixed directions in three dimensional space) are simultaneously resolved by each physical system into their apparent vector components. This set of four apparent vectors is sufficient to uniquely and accurately define the transformation matrix relating the local coordinate system of the two physical systems and thus their relative orientation.

Applications of the disclosed method and system relate to situations where observations made in one physical system are to be correlated with or acted upon by the other physical system.

4 Claims, 5 Drawing Figures

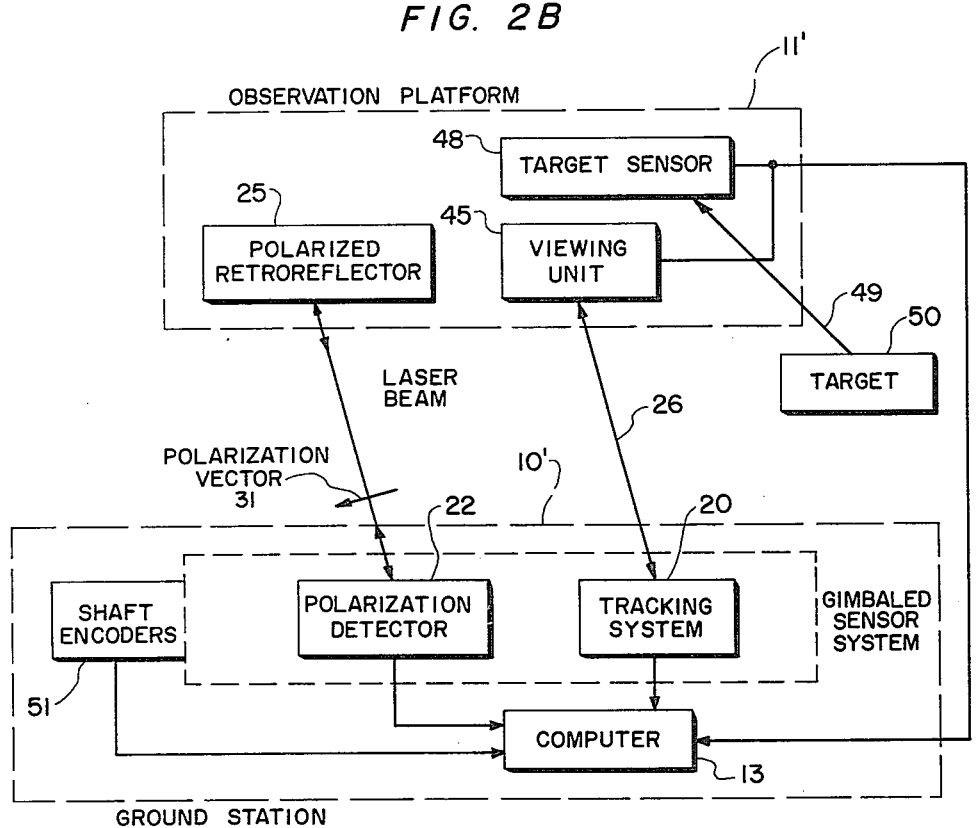

METHOD OF DETERMINING RELATIVE ORIENTATION OF PHYSICAL SYSTEMS

The invention described herein may be manufactured and used by or for the Government for governmental purposes without the payment of any royalties thereon or therefor.

BACKGROUND OF THE INVENTION

The present invention relates to target location methods and systems and navigational methods and systems, and more particularly to the determination of the precise location of an object in relationship to two viewing locations and to the precise location of an observation platform in relationship to a ground station.

At the present time there are a number of systems and methods utilized to relate the coordinate system at one location to the coordinate system at a different location. For example, if one location is an aircraft and the second location is a ground station, there is a need to relate the coordinate system of the aircraft, for example, for purposes of navigation, to the coordinate system of the ground station. The relationship between the coordinate system of the aircraft and the ground may be indicated by an "inertial platform" which is a system of two or three gyroscopes whose spin axes are mutually perpendicular.

Another example arises in target acquisition systems. The target is seen or sensed by an observer or sensor on an observation platform, such as a helicopter. One of the major problems involved in using such an observation platform is to translate the range, azimuth and elevation of the observed or sensed target from the reference frame (coordinate system) of the platform into the location of the target in the reference frame of the ground station. In general, the coordinate system of the observation platform will not be exactly aligned with that of the ground control station.

Traditionally, the relationship between the two coordinate systems may be determined by a method known as "Euler angles." A further description of the Euler angle method is set forth below. In general, however, the difficulty arises not because of mathematical inaccuracies in that system of transformation, but rather because of errors introduced by the physical system which attempts to measure angles corresponding to the mathematical definitions of the Euler angles. In the Euler angle method the rotated coordinate system is obtained from the unrotated coordinate system by a first angular motion about one axis followed by a second angular motion about a locally perpendicular second axis, and then followed by a third angular motion about the now displaced local axis corresponding to the first axis. By the third angular motion, the axes have been skewed so that it is difficult to obtain angles corresponding to the defined Euler angles with great accuracy in the physical system.

The angles measured by the inertial system are attempted to be as close as possible to the definitions of the Euler angles set forth below. The measured angles are then used as the basis for the standard Euler angle rotation matrix in order to define the coordinate system of the aircraft. This is subject to several problems: (1) drift in the gyroscope; (2) lack of sufficiently accurate angular pickoffs of reasonable size; and (3) the angles as actually measured are close to but not exactly the Euler angles as defined in the textbooks due to limitations in the measuring devices. There have been various proposals for physical systems involving electromechanical take-offs and axes which are rotated in different directions to compensate for errors in measurement. However, none of these has fully solved the problem of accuracy.

"Euler angles" are the three angular parameters that may be used to specify the orientation of a body with respect to reference axes. The definition generally given is as follows:

OXYZ is a right-handed Cartesian (orthagonal) set of fixed coordinate axes and Oxyz is a set attached to the rotating body.

The orientation of Oxyz can be produced by three successive rotations about the fixed axes starting with Oxyz parallel to OXYZ. Rotate through (1) the angle $\epsilon_1$ counterclockwise about OZ (OZ = $O_z$); (2) the angle $\epsilon_2$ counterclockwise about Ox ($O_x \neq$ OX); and (3) the angle $\epsilon_3$ counterclockwise about $O_z$ ($O_z \neq$ OZ) again. The line of intersection OK of the xy and XY planes is called the line of nodes.

A rotation about OZ is denoted, for example, by Z (angle). Then the complete rotation is, symbolically $$R(\epsilon_1, \epsilon_2, \epsilon_3) = Z(\phi)x(\theta)z(\epsilon_1)$$

where the rightmost operation is done first.

A point P will have coordinates (x,y,z) with respect to the body axes and (X,Y,Z) with respect to the fixed ones. These are related by the linear equations:

$$x = X \cos(x,X) + Y \cos(x,Y) + Z \cos(x,Z)$$

$$y = X \cos(y,X) + Y \cos(y,Y) + Z \cos(y,Z)$$

$$z = X \cos(z,X) + Y \cos(z,Y) + Z \cos(z,Z)$$

where (x,X) is the angle between the axes Ox and OX, etc. The nine direction cosines are expressed in terms of the three Euler angles.

It is apparent that no operation in R ($\epsilon_1$, $\epsilon_2$, $\epsilon_3$) can be replaced by a combination of the other two. Therefore, three parameters are needed to specify the orientation, and the amounts of the angles are unique (barring addition 360° rotations). In dynamical problems of rotating bodies, $\epsilon_1$, $\epsilon_2$ and $\epsilon_3$ can be used as independent angular coordinates.

SUMMARY OF THE INVENTION

The present invention consists of a method and several possible embodiments each of which implement the method to form a system.

The method consists of three steps:

(1) Two distinct directions in three-dimensional space must be selected. The direction in space chosen should have some physical property associated with it which can be simultaneously measured by appropriate devices in both physical systems. The term "beam vector" is applied to such a direction in space. More specifically, a beam vector is a laser beam, a line of sight or a gradient of a gravity field which is a direction defined in physical three-dimensional space by a directed line segment, whose direction cosines transform as vectors into the apparent direction cosines observed in the observer's local coordinate system.

(2) Appropriate means to simultaneously determine the apparant direction cosines of both selected beam vectors in the local coordinate systems of the physical system must be incorporated in each physical system. A physical system is an assemblage of equipment which shares a common local coordinate system. The means by which the beam vectors are sensed should share the common local coordinate system of the physical system to which it is attached and can therefore be considered to be incorporated within the physical system.

(3) The four apparent sets of direction cosines representing the two beam vectors are transmitted to a means for computing the transformation matrix which relates the local coordinate systems of the two physical systems and hence defines their relative orientation.

The method described above can be expanded pairwise to more than two physical systems providing that the direct calculation of the transformation matrix by the method disclosed above be done only between pairs of physical systems which measure the same two beam vectors.

In accordance with the present invention, two "beam vectors" are measured simultaneously. One set of measurements is made in the coordinate system of the first location, for example, a ground station, and the other set of measurements, of the same two vectors, is made in the coordinate system of a second location, for example, an observation platform such as a helicopter. The relationship between the two coordinate systems, i.e., their transformation, is then derived using a computer, preferably by the method described below.

The term "beam vector," as used herein, is a special use of those words and means a direction in space. A beam vector is a direction defined in physical three-dimensional space by a directed line segment whose direction cosines transform as vectors into the apparent direction cosines observed in the viewer's local coordinate system. This direction is defined by a laser beam or a line of sight or a gradient of a gravity field. A laser beam is a beam of coherent light produced by a laser, which is a device using the amplification of electromagnetic waves by stimulated emission of radiation, i.e., maser principle, and operated in the infrared or optical regions. The property of the laser beam which is significant in the subject invention is that it propagates essentially as a thin beam along a straight line. A line of sight is an imaginary line between two physical points as viewed, or sensed, using an optical instrument. For example, an object may be viewed in the cross-hairs of a viewing telecope and the "line of sight" will be the imaginary line between the viewed object and the crosshairs. A "vector" is a standard mathematical term referring to a complex quantity which can be represented by a line segment having magnitude and direction. The term "beam vector," as used herein, refers to the direction and location of a line in three-dimensional space which is a laser beam or line of sight or the gradient of a gravity field, and its length is not taken into account. The two beam vectors may be in any orientation and need not be perpendicular.

In one embodiment of the present invention, the two beam vectors are two laser beams each emitted at a different ground station and reflected from a helicopter back to the respective ground stations.

In another embodiment of the present invention, a line of sight is taken between a telescope at the ground station and a marking on the observation platform, i.e., one of the required beam vectors is the line of sight. The telescope is part of a tracking device on the ground which defines the optical vector pointing at the platform. A tracking device, for example, another telescope, on the observation platform observes the same beam vector, i.e., the same line of sight, and reports the components of the observed beam vector in the platform frame (in the platform coordinate system). The second beam vector common to both the ground and observation platform systems is the direction of polarization of a laser beam emitted from the tracking device at the ground station toward the observation platform and retroflected from the observation platform to the ground station. The polarization direction of the laser beam may be defined at one end, for instance, by a polarizing filter on the retroflector, and measured at the other end, for instance, at the ground station, by an appropriate analyzer.

Another embodiment of the present invention is to utilize a tracking device having an optical sensor on the observation platform which tracks a beacon placed in a known position relative to the ground station. This would result in one beam vector being measured between the platform and the ground station. The second beam vector (not necessarily an active optical or laser beam) from the beacon to the platform may then be calculated from the positions of the platform and beacon as determined by the tracker on the platform. Mathematically the beacon can be assumed to have a virtual coordinate system aligned perfectly with the ground station.

Some of the advantages of the method and system of the present invention, compared to using an inertial platform and conventional Euler angle computation, may be summarized as follows: (1) the system of the present invention is not subject to drift because measurements of the two optical vectors are made simultaneously in the coordinate systems of the observation platform and the ground station. In the conventional system the measurements are made within the observation platform coordinate frame and the approximation to the ground station reference frame provided by the inertial platform; (2) the system of the present invention utilizes angular pickoff devices having accuracies of the required precision and the required miniature size which are presently available. The system of the present invention does not depend on the ultra-precise direct physical measurement of matrix parameters but rather on indirect parameters (the observed components of a beam vector) to which the matrix coefficients are somewhat less sensitive; (3) the angles measured using the system and method of the present invention are exactly as defined and required by the mathematics; and (4) the method of the present invention requires no iterative procedures, such as numerical approximations obtained by a programmed computer in order to achieve the required accuracy, because the matrix is calculated only once and directly from measured data. Consequently there is no need, as with Euler angles, to force coefficients to converge to their "correct" values, which are assumed to be those which are almost constant after a number of iterations.

FEATURES OF THE INVENTION

It is consequently a feature of the present invention to provide a method of determining the relationship of a first coordinate system x, y, z at a first location, for example, at a ground station, to a physically separated coordinate system x', y', z' at a second and different location, for example, a tethered helicopter. In this method one firstly determines, at the first location, the direction of a first beam vector, such as a laser beam, the said first determination being in terms of the first coordinate system. Secondly one determines the direction of the first beam vector in terms of the second coordinate system. Thirdly one determines, at the first location, the direction of a second beam vector, such as a second independent laser beam, the third determination being in terms of said first coordinate system. Fourthly one determines the direction of the second beam vector in terms of the second coordinate system. These determinations, for example, in digital format, are communicated to a computer which automatically computes the relationship between the two coordinate systems based upon the relationship between the four determinations.

It is also a feature of the present invention to provide a system for the determination of the relationship of a first coordinate system x, y, z at a first location, for example, at a ground station, to a physically separated coordinate system x', y', z' at a second and different location. The system comprises means, such as a laser, at the first location which generates a first beam vector and means at said first location for determining the direction of said first beam vector, the said first determination being in terms of the first coordinate system. The system further comprises means to determine the direction of the first beam vector in terms of the second coordinate system. Means at the first location generates a second beam vector, such as a second laser beam, and means at the first location determines the direction of said second beam vector in terms of said first coordinate system. Means determines the direction of the second beam vector in terms of the second coordinate system, and further means receives the four determinations and automatically computes the relationship between said two coordinate systems using a computer and based upon the relationship between the four determinations.

BRIEF DESCRIPTION OF THE DRAWINGS

Other features and objectives of the invention will be apparent from the following detailed description which should be read in connection with the accompanying drawings.

In the drawings:

FIG. 2B is a block schematic diagram illustrating a second embodiment of the present invention.

DETAILED DESCRIPTION OF THE INVENTION

Figure 1:
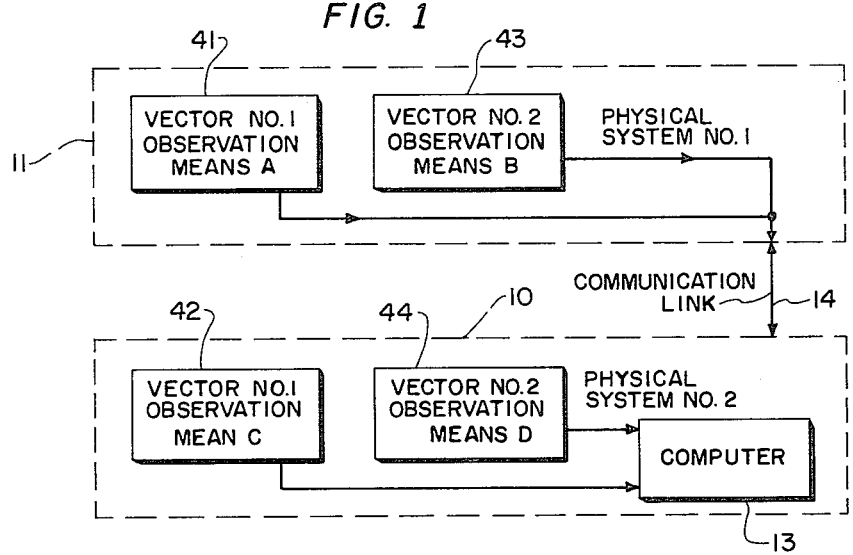
FIG. 1 is a block schematic diagram of the system of the present invention.

In the system shown in FIG. 1, the two beam vectors are directions defined in space by a line of sight, a laser beam or the gradient of a gravity field. For example, if the beam vector is defined by a laser beam, the direction cosines of the line along which the laser beam propagates may be determined by measuring the apparent azimuth and elevation of the received laser beam. If the beam vector is defined by the line of sight to an object, the direction cosines are determined by aligning a telescope such that the object appears in the crosshairs and then determining the apparent azimuth and elevation of the telescope. If the beam vector is defined by the gradient of a gravity field, for example, the direction "down" in the gravitational field near the surface of the earth, the direction cosines may be found by the use of a level.

In each physical system 11 and 10, there are mounted two means of observing the physical characteristic defining the beam vectors. Each of these means report in the local coordinate system of their respective physical systems the apparent direction cosines of the beam vectors. Thus, observation means A, 41, reports the apparent direction cosines of the first beam vector in the coordinate system of the first physical system 11, etc. If the beam vector is defined in one system, for example, by the first beam vector, transmitting a laser beam from first physical system 11 to second physical system 10, the observation means 41 which would normally observe that beam vector would be replaced by the device which generates the laser beam which would report the apparent direction cosines of the line along which the beam was sent out.

The two physical systems 10 and 11 are in communication with each other by means of communications link 14 and the data from the vector observation means 41, 42, 43 and 44 are fed into a common computer 13.

Figure 2A:
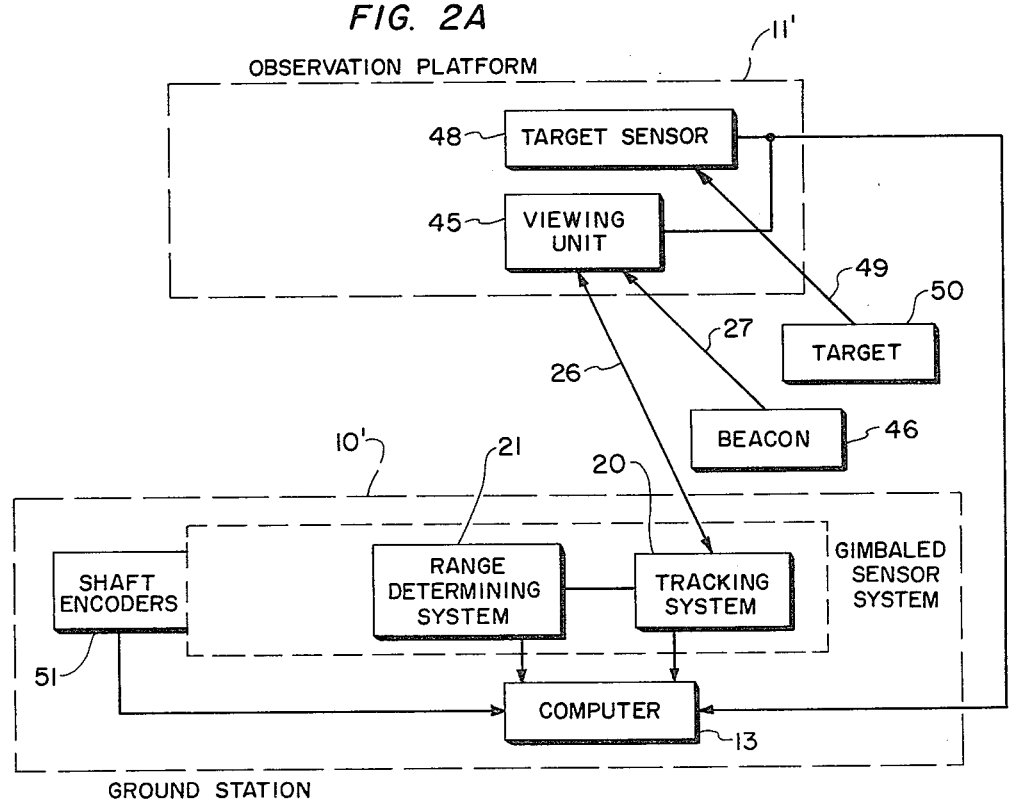
FIG. 2A is a block schematic diagram which is a composite diagram illustrating an embodiment of the present invention.

FIGS. 2A and 2B illustrates two possible embodiments of the disclosed method. As stated above, it is necessary to select two beam vectors which are convenient and then to define and/or measure them simultaneously. Both embodiments use a beam vector 26 which is a line of sight between the ground station 10' and the observation platform 11'. A television or other type of tracking system 20 at the ground station 10' points the gimbaled sensor system 47 at the observation platform 11'. Approximate shaft encoders 51 on the gimbaled sensor system 47 determine the apparent relative direction of the observation platform 11' in the ground station coordinate system and feed this data into the computer 13. A viewing unit 45 determines the apparent direction of the ground station and communicates this to the computer 13. Thus the first beam vector 26, which is the line of sight between the ground station and the observation platform, is simultaneously determined in the two physical systems (the ground station and the observation platform) whose relative orientation is to be determined.

The viewing unit 45 may consist of a television type tracker, spinning retroreflector assembly, scanning optical detector/radar, etc., which can determine to the required accuracy the apparent direction of the ground station in terms of the local coordinates of the observation platform. In the first embodiment, as shown in FIG. 2A, the viewing unit 45 must also determine the apparent direction of a beacon 46 which is placed in a known position relative to the ground station.

This beacon 46 may be considered to have a virtual coordinate system perfectly aligned with that of the ground station. A range determining system such as a laser rangefinger, radar, or optical surveying instrument is used to determine the range between the observation platform and the ground station and thus compute the position of the observation platform in terms of the ground station coordinate system.

Once this is known it is a simple matter to compute the apparent direction of the line of sight 27 between the beacon and the observation platform in terms of the ground station coordinate system. This line of sight 27 forms the second beam vector for this first mentioned embodiment. Note that this beacon 46 need only have a known location in terms of the ground station and be detectable by the viewing unit 45, i.e., the beacon may be completely passive.

The second embodiment of FIG. 2B does not use the beacon 46 of FIG. 2A, but instead uses the polarization of a laser beam directed along the line of sight (beam vector 26) between the observation platform and the ground station. The laser beam is generated at the ground station 10' and is circularly polarized so as to maximize the amount of energy returned by the polarized retroreflector 25. The polarized retroreflector 25 consists of a retroreflector with a polarizing filter covering its aperture. This allows only the component of the laser beam which is aligned with the polarizing filter to be present in the return beam. The direction of this polarization (beam vector 31) is thus defined in the coordinate system of the observation platform and measured by an appropriate polarization detector 22 at the ground station 10'. The polarization detector 22 consists of a polarization analyzer which measures the angle between the polarization of the retroreflected beam and a fixed reference polarization direction defined at the polarization detector. Because of the oblique incidence on the polarizing filter of the polarized retroreflector a slight correction factor must be applied to get the correct components of the polarization vector 31 in the ground coordinate system. This polarization vector 31 is the second beam vector in the second embodiment. If $\psi$ is the angle of the plane of incidence of the laser beam measured in the xy plane of the observation platform 11', $\mu$ is the index of refraction of the polarizing filter material and $\theta$ is the angle of incidence of the laser beam 26 with the polarizing filter, then the roll angle C measured by the roll detector 22 must have a correction angle $\omega$ added to it given by $$\omega = \tan^{-1}\left\{ \left( \frac{\cos\theta + \frac{1}{\mu^2}\sqrt{\mu^2 - \sin^2\theta}}{1 + \frac{\cos\theta}{\sqrt{2 - \sin^2\theta}}} \right) \tan\psi \right\}$$

In either of the two embodiments described above the apparent directions of the two beam vectors in each coordinate system are the inputs to the computer 13 which calculates the transformation matrix relating the coordinate system of the physical system (observation platform) 11' and the physical system (ground station) 10'. The distance from the range determining system 21, shown only in FIG. 2A, is combined with the apparent direction of the observation platform 11' as sensed by the tracker 20 to compute the position of the observation platform 11'.

One application for the disclosed method and system is in the location of a distant target 50, which is sensed by a target sensor 48 mounted on the observation platform 11. The target sensor 48 reports the apparent direction 49 and range to the target 50 in terms of the local coordinates of the observation platform 11'. The transformation matrix computed by the system disclosed above operates on the line of sight to the target 49, as a vector to transform it into the equivalent representation of the line of sight of the local coordinates of the observation platform as if it were to have been perfectly aligned with those of the ground station. Using this and the range to the target reported by the target sensor 48, the location of the target relative to the location of the observation platform is determined. By taking into account the location of the platform, as calculated by the disclosed system of the present invention, the location of the target can be determined relative to the ground station.

AN EXAMPLE OF VECTOR TRANSFORMATION

It has already been asserted that the measurement of two beam vectors in two coordinate systems is sufficient to accurately relate the coordinate systems. The beam vectors are like ordinary vectors in that they are invarient, i.e., not changed, under a coordinate transformation.

There will now be described a scheme to perform that computation. It relies upon automatic computation in a computer using a standard program language.

Figure 3:
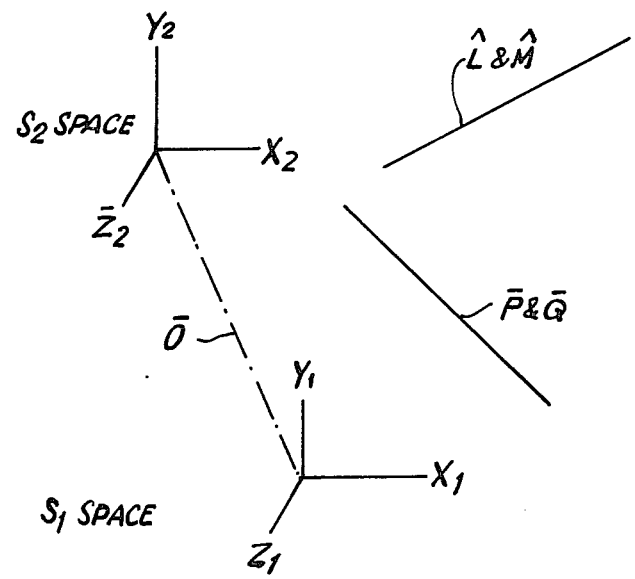
FIGS. 3 and 4 are perspective views illustrating the relationships of coordinate systems.

In the explanation which follows, the symbols will be defined as follows:

$\overline{V}$ is any vector (the apparent components of any beam vector $\overline{K}$) as measured in the ground station ($S_1$ space, i.e., reference frame $S_1$). The coordinates of the ground station are $x_1$, $y_1$, $z_1$ in $S_1$ space, as shown in FIG. 3.

$\overline{W}$ is again any vector (the apparent components of the beam vector $\overline{K}$) but measured in the coordinate system ($S_2$ space), i.e., the observation platform. The coordinates of the $S_2$ space, as seen from the ground station ($S_1$ space) are $x_2$, $y_2$, $z_2$ $\overline{O}$ is a vector which joins the origins of the $S_1$ and $S_2$ coordinate systems, see FIG. 3. The vector $\overline{O}$ is measured in $S_1$ space.

The equation which is the transformation from $\overline{W}$ (measured in $S_2$ space) to $\overline{V}$ (measured in $S_1$ space) is:

eq. 1: $\overline{V} = [A]\overline{W} + \overline{O}$ where: [A] is a rotation matrix, i.e., an operator, which precesses any vector, in this case $\overline{W}$, measured in $S_2$ space about a principal axis of rotation (note $\overline{O}$ is not necessarily the principal axis of rotation). The rotated vector $\overline{W}$ has components in the $S_1$ space, that is, its components are $x_1$, $y_1$, $z_1$.

There now occurs the simultaneous measurement, from the $S_1$ and $S_2$ spaces, of two different beam vectors which results in a pair of four different apparent vectors $\hat{L}$ and $\hat{P}$ (observed in $S_2$ space) and $\hat{M}$ and $\hat{Q}$ (observed in $S_1$ space). $\hat{L}$ and $\hat{M}$ are representations of the same first beam vector, and $\hat{P}$ and $\hat{Q}$ are representations of the same second beam vector.

In general, a beam vector in $S_2$ space has the components in $S_1$ space given by the matrix transformation [A]

eq. 2: $\overline{\text{Vector}}\,(S_1) = [A]\,\overline{\text{Vector}}\,(S_2)$

Substituting the $\hat{L}$, $\hat{P}$, $\hat{M}$ and $\hat{Q}$ beam vectors into eq. 2 we obtain:

eq. 3: $\hat{M} = [A]\hat{L}$ eq. 4: $\hat{Q} = [A]\hat{P}$

If one can imagine the vector $\hat{M}$ (which is $\hat{L}$) to lie on the surface of a cone about the physical principal axis of rotation $\hat{R}$ the vector $\hat{P}$ (which is $\hat{Q}$) will, in general, also lie on the surface of a cone about R.

Figure 4:
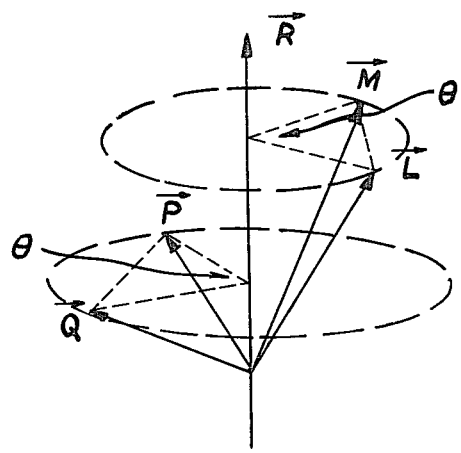

Thus, it is convenient to consider the expressions of the respective vectors in a cylindrical coordinate system $S_3$ with the principal axis $Z''$ along $\hat{R}$ and with some fixed arbitrarily chosen $x''$ such that $x''$, $y''$, $z''$ form a right-handed orthagonal triad in the usual sense. This is shown in FIG. 4. If we write the vectors $\hat{L}, \hat{M}, \hat{P}, \hat{Q}$ in the cylindrical coordinate system $S_3$, we obtain:

$$\hat{L} = \cos\theta_L \cos\psi_L \, i'' + \sin\theta_L \cos\psi_L j'' + \sin\psi_L k'' \quad \text{(eq. 5)}$$

$$\hat{M} = \cos\theta_M \cos\psi_L \, i'' + \sin\theta_M \cos\psi_L j'' + \sin\psi_L k'' \quad \text{(eq. 6)}$$

$$\hat{P} = \cos\theta_P \cos\psi_P \, i'' + \sin\theta_P \cos\psi_P j'' + \sin\psi_P k'' \quad \text{(eq. 7)}$$

since $\psi_P = \psi_Q$ (because $\hat{P}$ has precessed about $\hat{R}$). The angle $\psi$ is measured from $\hat{R}$ to the respective vector, the angle $\theta$ is about $\hat{R}$ as an axis.

$$\hat{Q} = \cos\theta_Q \cos\psi_P \, i'' + \sin\theta_Q \cos\psi_P j'' + \sin\psi_P k'' \quad \text{(eq. 8)}$$

If we examine the difference vectors $\widehat{(L-M)}$ and $\widehat{(P-Q)}$ we obtain:

$$\widehat{(L-M)} = (\cos\theta_L - \cos\theta_M)\cos\psi_L \, i'' + (\sin\theta_L - \sin\theta_M)\cos\psi_L j'' + 0\, k'' \quad \text{(eq. 9)}$$

$$\widehat{(P-Q)} = (\cos\theta_P - \cos\theta_Q)\cos\psi_P \, i'' + (\sin\theta_P - \sin\theta_L)\cos\psi_P j'' + 0\, k'' \quad \text{(eq. 10)}$$

The difference vectors $\widehat{(L-M)}$ and $\widehat{(P-Q)}$ are both perpendicular to $k''$, which is the axis of rotation $\hat{R}$. Thus, if we form the normalized cross product of these vectors, we obtain a vector along the axis of rotation $$\pm\hat{R} = \widehat{(L-M)} \times \widehat{(P-Q)} \quad \text{(eq. 11)}$$

If we now compute the dot product of $\hat{L}$ and $\hat{M}$ respectively with $\hat{R}$, we get a scaler s, such that $s\hat{R}$ is the $k''$ component of $\hat{L}$ and $\hat{M}$. We are then able to compute the components of the vectors $\hat{L}$ and $\hat{M}$ which are perpendicular to the axis of rotation. Thus $\hat{G} = \widehat{(L-s\hat{R})}$ and $\hat{H} = \widehat{(M-s\hat{R})}$ where $\hat{L}\cdot\hat{R} = \hat{M}\cdot\hat{R} = S$ (eq. 12).

Utilizing the vectors $\hat{G}$ and $\hat{H}$ just obtained, we may recompute the vector along the axis of rotation by taking the cross product of $\hat{G}$ and $\hat{H}$.

$$\hat{G} \times \hat{M} = \alpha i + \beta j + \gamma k \quad \text{(eq. 13)}$$

The smallest angle between the vectors $\hat{G}$ and $\hat{H}$ is given by $$\theta = \text{Tan}^{-1}\left(\frac{|\hat{G} \times \hat{H}|}{|\hat{G} \cdot \hat{H}|}\right) \quad \text{(eq. 14)}$$

$$0 \leq \theta \leq H$$

Using these parameters a general form of the [A] matrix has been developed from quaternion algebra. Quaternion algebra is an associative, noncommutative algebra based upon four independent units, 1, i, j and k. The general form of the [A] matrix is:

$$[A] = \begin{bmatrix} a_{11} & a_{12} & a_{13} \\ a_{21} & a_{22} & a_{23} \\ a_{31} & a_{32} & a_{33} \end{bmatrix} \quad \text{(eq. 15)}$$

$$a_{11} = \cos^2\left(\frac{\theta}{2}\right) - (1 - 2\alpha^2)\sin^2\left(\frac{\theta}{2}\right)$$

$$a_{12} = \gamma\sin(\theta) + 2\alpha\beta\sin^2\left(\frac{\theta}{2}\right)$$

$$a_{13} = \beta\sin(\theta) + 2\alpha\gamma\sin^2\left(\frac{\theta}{2}\right)$$

$$a_{21} \doteq \gamma\sin(\theta) + 2\beta\alpha\sin^2\left(\frac{\theta}{2}\right)$$

$$a_{22} = \cos^2\left(\frac{\theta}{2}\right) - (1 - 2\beta^2)\sin^2\left(\frac{\theta}{2}\right)$$

$$a_{23} = -\alpha\sin(\theta) + 2\beta\gamma\sin^2\left(\frac{\theta}{2}\right)$$

$$a_{31} = -\beta\sin(\theta) + 2\gamma\alpha\sin^2\left(\frac{\theta}{2}\right)$$

$$a_{32} = \alpha\sin(\theta) + 2\gamma\beta\sin^2\left(\frac{\theta}{2}\right)$$

$$a_{33} = \cos^2\left(\frac{\theta}{2}\right) - (1 - 2\gamma^2)\sin^2\left(\frac{\theta}{2}\right)$$

Thus, from the two measured, non-coincident beam vectors $\hat{L}$ and $\hat{P}$ we have obtained the rotation matrix [A] which represents the physical orientation of $S_2$ with respect to $S_1$. Since we can also measure $\bar{O}$, which is essentially the coordinates of the origin of $S_2$ in $S_1$ space, we now have all information necessary to solve the original problem of computing the coordinates of the point of interest in $S_1$ space from an observation made in $S_2$ space.

The transformation matrix [A], given above, is general and may be used with any set of numerical data, see Goldstein, *Classical Mechanics* (1965) and Morse and Feschback, *Methods of Theoretical Physics* (1953). The computer will be programmed with the definitions $a_{11}$ through $a_{33}$, as set forth above. The only numerical values that need be inserted are the measured values of the beam vectors $\hat{L}, \hat{P}$ and $\hat{M}, \hat{Q}$. Subsequently, after any measurement of a vector in $S_2$ space may be automatically computed in the computer by the specific transformation matrix [A] which relates to the two spaces $S_1$ and $S_2$. For example, a line of sight $\bar{T}$ and the range to a target may be taken from the observation platform, for example, a helicopter, in $S_2$ space, and reported to the ground station. That line of sight $\bar{T}$ and its associated range is transformed, by computer, into the coordinate system of the ground station ($S_1$ space) by the matrix [A] to find the coordinates of the target.

What is claimed is:

1. A method for obtaining information from which an attitude matrix can be derived which is representative of the relationship of the coordinate systems of at least two separate physical systems comprising sensing first and second beam vectors the apparent direction of which can be sensed at all of said physical systems, actively measuring at one of said physical systems the directional components of said first beam vector in the coordinate system of said one physical system, actively measuring at another of said physical systems the directional components of said first beam vector in the coordinate system of said other physical system, said measuring being accomplished simultaneously with the preceding measuring step, actively measuring at said one physical system the directional components of said second beam vector in the coordinate system of said one physical system, actively measuring at said other physical system the directional components of said second beam vector in the coordinate system of said other physical system, said measuring being accomplished simultaneously with the immediately preceding step, communicating from both of said physical systems data representative of the measurements at said physical systems to a central processing means, and developing said attitude matrix from data derived from both of said physical systems.

2. The method of claim 1 wherein at least one of said beam vectors is produced by a laser.

3. The method of claim 1 wherein at least one of said beam vectors is sensed by observing visually the line of sight between an object viewed from said physical systems and a viewing instrument at the corresponding physical system.

4. A method for obtaining information from which an attitude matrix can be derived which is representative of the relationship of the coordinate systems of at least two separate physical systems comprising sensing first and second beam vectors the apparent direction of which can be sensed at all of said physical systems, the second beam vector being the polarization direction of an optical beam, actively measuring at one of said physical systems the directional components of said first beam vector in the coordinate system of said one physical system, actively measuring at another of said physical systems the directional components of said first beam vector in the coordinate system of said other physical system, said measuring being accomplished simultaneously with the preceding measuring step, actively measuring at said one physical system with polarization detection means the directional components of said second beam vector in the coordinate system of said one physical system, measuring at said other physical system with polarization defining means the directional components of said second beam vector in the coordinate system of said other physical system, said measuring being accomplished simultaneously with the immediately preceding step, communicating from both of said physical systems data representative of the measurements at said physical systems to a central processing means, and developing said attitude matrix from data derived from both of said physical systems.

* * * * *